United States Patent [19]

Rathmann

[11] Patent Number: 4,608,499
[45] Date of Patent: Aug. 26, 1986

[54] POWER SYSTEM AND POWER GENERATION METHOD

[75] Inventor: Søren Rathmann, Horsens, Denmark

[73] Assignee: Silcon Elektronik A/S, Kolding, Denmark

[21] Appl. No.: 576,043

[22] Filed: Feb. 1, 1984

[30] Foreign Application Priority Data

Feb. 1, 1983 [DE] Fed. Rep. of Germany ....... 3303223

[51] Int. Cl.⁴ .............................................. H02J 9/00
[52] U.S. Cl. ..................................... 307/66; 363/126; 363/132; 363/17
[58] Field of Search ...................... 307/66, 64, 85–87; 363/17, 132, 126, 41

[56] References Cited

U.S. PATENT DOCUMENTS

| | | | |
|---|---|---|---|
| 4,222,096 | 9/1980 | Capewell | 363/126 X |
| 4,277,692 | 7/1981 | Small | 307/66 |
| 4,366,390 | 12/1982 | Rathmann | 307/66 |
| 4,400,625 | 8/1983 | Hussey | 307/66 |
| 4,424,556 | 1/1984 | Maeda et al. | 363/132 X |

FOREIGN PATENT DOCUMENTS 3033034 9/1980 Fed. Rep. of Germany .
2128030 7/1981 Fed. Rep. of Germany .

Primary Examiner—A. D. Pellinen
Assistant Examiner—T. DeBoer
Attorney, Agent, or Firm—Peter K. Kontler

[57] ABSTRACT

A power system includes an a-c power supply which constitutes a voltage source for a user of d-c current. The a-c power supply is designed to generate an output voltage having a trapezoidal wave form. This is achieved by generating a sinusoidal voltage and then suppressing the waves at a predetermined amplitude to obtain flat-topped voltage waves. The edges of the trapezoidal waves representing the output voltage of the a-c power supply have slopes which equal or exceed the corresponding slopes of a sinusoidal curve having the same maximum amplitude and period as the trapezoidal output voltage. The a-c power supply is further designed to maintain the mean or average value, as well as the maximum value, of its output voltage constant.

39 Claims, 6 Drawing Figures

POWER SYSTEM AND POWER GENERATION METHOD

BACKGROUND OF THE INVENTION

The invention relates generally to a power system and a method of generating power.

More particularly, the invention relates to a power system and a power generation method in which an a-c voltage source supplies current for a d-c consumer.

A known power system has an a-c voltage source which supplies a d-c consumer with current. The output voltage of the a-c voltage source is rectified in a rectifier and smoothed in a smoothing circuit before being fed to the d-c consumer. The smoothing circuit contains a smoothing capacitor which has a relatively high capacitance in order to minimize waviness in the d-c input voltage transmitted to the d-c consumer. A high capacitance is also of advantage when the smoothing capacitor is to serve as a buffer, that is, when the smoothing capacitor is to constitute a temporary voltage source in the event of a brief failure of the a-c voltage source or in the event that the d-c consumer temporarily draws an excessive load. Due to its high capacitance, the smoothing capacitor will not discharge completely between consecutive half waves of the a-c voltage during normal operation.

The output current of the a-c voltage source, and hence the input current to the rectifier, flows only while the amplitude of the a-c voltage exceeds the residual voltage in the smoothing capacitor. Consequently, the period of current flow during each half cycle of the a-c output voltage is generally much shorter than the period of the half cycle. The period of current flow decreases as the capacitance of the smoothing capacitor increases.

The short period of current flow results in an unfavorably high ratio of the effective value to the mean or average value of the current flowing through the rectifier. For a given mean or average value of the current, the rectifier must therefore be designed for a much higher peak value of the current than would normally be the case for the particular mean or average value.

OBJECTS AND SUMMARY OF THE INVENTION

It is an object of the invention to provide a power system which enables the rectifier to be designed for lower peak values of current.

Another object of the invention is to provide a power system which enables the period of current flow to be increased.

An additional object of the invention is to provide a power system of the type outlined above which makes it possible to obtain a smaller ratio of effective current value to mean or average current value in the rectifier.

A further object of the invention is to provide a power generation method which makes it possible to employ a rectifier designed for a relatively low peak value of current.

It is also an object of the invention to provide a power generation method which enables the period of current flow to be increased.

Still another object of the invention is to provide a power generation method which makes it possible to obtain a lower ratio of effective current value to mean or average current value in a rectifier.

The preceding objects, as well as others which will become apparent as the description proceeds, are achieved by the invention.

One aspect of the invention resides in a power system which comprises a d-c power consuming unit including a rectifier and a source of load. The power system further comprises an a-c power supply for the power consuming unit. The power supply is designed to generate an output voltage having an at least approximately trapezoidal wave form when the d-c unit consumes power. The wave form corresponding to the a-c output voltage has a finite slope at substantially all absolute values of the output voltage smaller than the maximum amplitude of the wave form. The absolute values of the slopes at substantially all absolute values of the a-c output voltage other than the maximum amplitude of the wave form are at least equal to the corresponding absolute values of the slope of a sinusoidal curve having the same maximum amplitude and period as the wave form corresponding to the a-c output voltage.

The d-c power consuming unit may further include a smoothing circuit for the d-c voltage which issues from the rectifier. The smoothing circuit preferably contains a smoothing capacitor.

The trapezoidal voltage waves generated by the a-c power supply according to the invention cause current to flow through the rectifier for a longer period than would be the case for sinusoidal voltage waves having the same maximum amplitude and period as the trapezoidal waves. This is the case even when the capacitance of the smoothing capacitor is high. Furthermore, the a-c power supply according to the invention causes the current entering the rectifier to have an almost rectangular wave form. Accordingly, the ratio of effective value to mean or average value of the current entering the rectifier is smaller than for sinusoidal a-c output voltages. This makes it possible to design the rectifier for smaller peak values of current and/or to utilize the rectifier more efficiently. Moreover, although the wave form of the current entering the rectifier can become rectangular, this condition is never achieved and the wave form remains trapezoidal. The trapezoidal wave form has the advantage that the edges of the waves have finite slopes as opposed to the rectangular wave form where the slopes are infinite. The finite slopes of the trapezoidal wave form make it possible for the smoothing capacitor to have a higher capacitance than would be possible if the current entering the rectifier had a rectangular wave form.

Advantageously, the a-c power supply according to the invention is designed in such a manner that the trapezoidal wave form of the a-c output voltage tends to become sinusoidal as the load drawn by the d-c power consuming unit approaches zero. Preferably, the wave form of the a-c output voltage assumes a sinusoidal shape at zero load. In this manner, the harmonics content of the a-c output voltage decreases with decreasing load so that the capacitor and the rectifier are not subjected to high frequency alternating currents.

The a-c power supply may include a control unit which maintains the mean or average value as well as the maximum value of the a-c output voltage constant. This causes the period of current flow in the rectifier to increase automatically as the load drawn by the d-c power consuming unit increases. Thus, when the load increases, the a-c output voltage initially begins to decrease. The control unit, however, counteracts the decrease in the a-c output voltage since it attempts to maintain the maximum amplitude of the output voltage constant. Accordingly, the period of current flow increases as the only means of compensating for the inability of the a-c output voltage to decrease freely.

The control unit may comprise an a-c voltage regulator having an input which senses the mean or average value of the a-c output voltage and an output which emits signals indicative of the mean or average value. The control unit may further comprise a sine wave generator which is connected with the output of the a-c voltage regulator and forms a sine wave having an amplitude determined by the a-c output voltage. The sine wave generator is designed to clip each half wave having an amplitude greater than a predetermined amplitude at such predetermined amplitude. The predetermined amplitude may correspond to the constant maximum amplitude of the a-c output voltage. The control unit generates control signals which regulate the a-c output voltage, and the a-c power supply is designed for feedback of the output voltage to the control unit. The sine curve generator of the control unit serves to maintain the maximum amplitude of the output voltage constant while the voltage regulator serves to maintain the mean or average value constant.

The sine wave generator emits a voltage signal and this signal may be superimposed with a feedback voltage signal representing the output current or voltage of the a-c power supply. Preferably, the superimposition is performed in such a manner that the superimposed portions of the two signals have opposite signs. By superimposing the feedback signal and the output signal of the sine curve generator, the period of current flow increases automatically with increasing load drawn by the d-c power consuming unit.

The a-c power supply may further comprise an adjustable static converter as well as a d-c voltage source which is arranged to supply d-c current to the converter. The static converter is favorably disposed so as to form part of the feedback circuit via which the a-c output voltage is fed back to the control unit. The static converter here constitutes a simple output regulating element of the regulating circuit for the a-c output voltage.

Adjusting means is provided for the static converter and preferably comprises a comparator having flip-flop characteristics. The comparator has an output which delivers adjusting signals to the static converter and is also provided with a pair of inputs. One of the inputs is connected with the output of a saw-tooth wave generator while the other input is connected with the output of the control unit. The saw-tooth wave generator is synchronized with the sine wave generator and has a frequency many times that of the sine wave generator. This arrangement enables pulse width modulation of the adjusting signals for the static converter to be achieved in a simple fashion. After filtering out the frequency and harmonics of the adjusting signals, the static converter generates an a-c voltage having a wave form which corresponds to that of the voltage delivered by the sine wave generator and the control unit.

As mentioned earlier, the a-c power supply is preferably designed in such a manner that the wave form of the a-c output voltage tends to become sinusoidal as the load drawn by the d-c power consuming unit approaches zero. The dependence of the wave form of the a-c output voltage upon load may be achieved by providing the control unit with a comparator which does not possess flip-flop characteristics. The latter comparator has a pair of inputs as well as an output which constitutes the output of the control unit. This output is connected with the respective input of the adjusting comparator for the static converter, namely, that input of the adjusting comparator which is not connected with the saw-tooth wave generator. One of the inputs of the comparator of the control unit is connected with the output of the sine wave generator. The other input of the comparator of the control unit is connected with a conductor which transmits the feedback voltage corresponding to the output voltage of the a-c power supply.

The static converter may be reversible and then has an a-c input/output as well as a d-c input/output. An a-c voltage source or generator is incorporated in the a-c power supply and is connected to the a-c input/output of the static converter. The d-c voltage source which, as mentioned earlier, is arranged to supply d-c current to the static converter, is connected with the d-c input/output of the latter. The d-c voltage source is here preferably designed as a rechargeable device for storing electrical energy and may, for example, be constituted by a rechargeable battery or an electrolytic capacitor. A d-c voltage regulator is provided to regulate charging of the d-c voltage source. The d-c voltage regulator functions to shift the phase of the a-c voltage at the a-c input/output of the static converter relative to the phase of the a-c voltage generated by the a-c voltage source in such a manner that the a-c voltage source charges the d-c voltage source when the latter is not fully charged. The d-c voltage regulator also functions to regulate the phase of the adjusting signals delivered to the static converter in dependence upon the degree to which the d-c voltage source is charged, that is, in dependence upon the voltage generated by the d-c voltage source. Furthermore, a current limiting unit is disposed between the a-c voltage source and the a-c input/output of the static converter. Similarly to the emergency power supply system disclosed in the German Pat. No. 30 33 034, this arrangement enables the power system of the invention to supply current in the event of an emergency. Thus, the a-c power supply according to the invention is here capable of providing an uninterrupted flow of current to the d-c power consuming unit in the event of a failure either of the static converter or of the a-c voltage source. The control unit and the pulse width modulator in this embodiment of the a-c power supply serve several functions including phased regulation of a-c voltages, stabilization of the voltage of the d-c voltage source and stabilization of the output voltage of the a-c power supply.

If galvanic separation of the static converter, the d-c power consuming unit and the a-c voltage source or net is necessary or desirable, the current limiting unit may comprise a leakage-reactance transformer having three windings as disclosed in the German Pat. No. 31 28 030. One of the windings is coupled to the a-c input/output of the static converter while another of the windings is connected with the terminals of the a-c voltage source. The third winding is connected with the terminals of the d-c power consuming unit. Such a leakage-reactance transformer not only provides galvanic separation of the static converter, the d-c power consuming unit and the a-c voltage source or net but also provides the necessary current limiting effect. This makes a special current limiting device unnecessary.

A power generating method in accordance with the invention involves the generation of an a-c output voltage having an at least approximately trapezoidal wave form. The wave form has a finite slope at substantially all absolute values of the output voltage smaller than the maximum amplitude of the wave form. The absolute values of the slope at substantially all absolute values of the output voltage other than the maximum amplitude are at least equal to the corresponding absolute values of the slope of a sinusoidal curve having the same maximum amplitude and period as the trapezoidal wave form. The trapezoidal a-c output voltage is rectified to obtain a d-c voltage which is then used to develop power.

The novel features which are considered as characteristic of the invention are set forth in particular in the appended claims. The improved power system itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
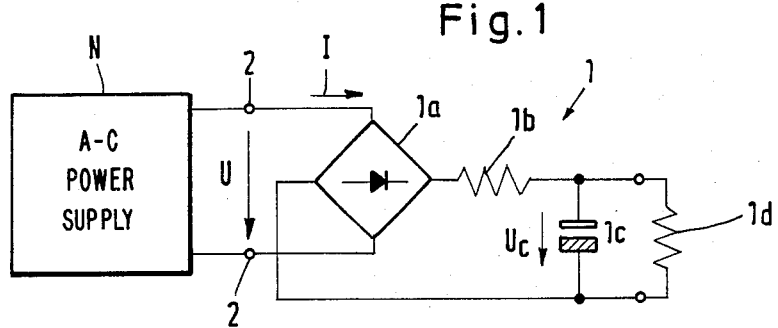
FIG. 1 schematically illustrates a power system according to the invention having an a-c power supply and a d-c power consuming unit.

FIG. 1 schematically illustrates a power system according to the invention.

The power system includes a d-c power consuming unit which is generally identified by the reference numeral 1 and has a pair of input terminals 2. The power system further includes an a-c power supply N which is connected to the terminals 2. The a-c power supply N generates an a-c voltage U across the terminals 2 and delivers an a-c current I to the d-c power consuming unit 1. The a-c voltage U represents the output voltage of the a-c power supply N and the input voltage of the d-c power consuming unit 1. Similarly, the a-c current I represents the output current of the a-c power supply N and the input current of the d-c power consuming unit 1.

The d-c power consuming unit 1 comprises a rectifier 1a which is here assumed to be in the form of a bridge circuit. A smoothing circuit is connected to the output of the rectifier 1a and includes an ohmic resistor 1b as well as a smoothing capacitor 1c. The resistor 1b and the smoothing capacitor 1c are arranged in series. An ohmic consumer 1d of d-c current, that is, a d-c power consuming device, is connected in parallel with the smoothing capacitor 1c.

The smoothing capacitor 1c is designed as a buffer. In other words, the capacitance of the smoothing capacitor 1c is so large that the smoothing capacitor 1c is capable of temporarily supplying the consumer 1d with current in the event that the a-c power supply N malfunctions temporarily or in the event that the consumer 1d temporarily draws excessive current.

Figure 2:
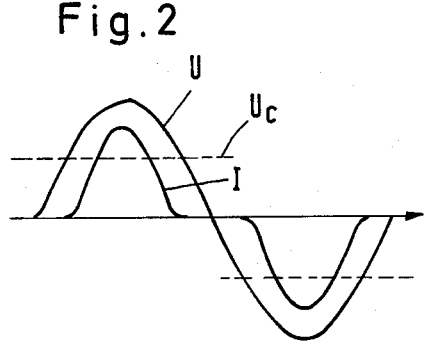
FIG. 2 shows the wave forms of the input voltage and current to a rectifier of a d-c power consuming unit which is provided with a smoothing capacitor and is supplied with current from an a-c power supply having a sinusoidal output voltage.
Figure 3:
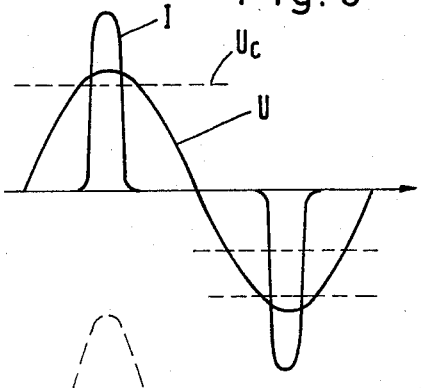
FIG. 3 is similar to FIG. 2 but shows the wave forms of the input voltage and current for a smoothing capacitor having a higher capacitance than in FIG. 2.

In order to provide an understanding of the invention, it is assumed for the moment that the a-c power supply N generates a sinusoidal output voltage U as illustrated in FIGS. 2 and 3. It is further assumed that the smoothing capacitor 1c has a residual voltage $U_c$. FIG. 2 represents a situation in which the smoothing capacitor 1c has a relatively low capacitance while FIG. 3 represents a situation in which the smoothing capacitor 1c has a relatively high capacitance. The residual voltage $U_c$ in FIG. 3 is accordingly greater than in FIG. 2.

As seen in FIGS. 2 and 3, the output current I of the a-c power supply N begins to flow only when the magnitude of the output voltage U exceeds the residual voltage $U_c$ of the smoothing capacitor 1c. The flow of the output current I is interrupted as soon as the magnitude of the output voltage U drops below the residual voltage $U_c$. Thus, during each half cycle of the output voltage U, the output current I flows for a time interval which is shorter than the period of the half cycle.

As seen from a comparison of FIGS. 2 and 3, the period of current flow decreases as the capacitance, and hence the residual voltage $U_c$, of the smoothing capacitor 1c increases. Furthermore, the peak value of the output current I increases with increasing capacitance of the smoothing capacitor 1c. The magnitude of the output current I thus deviates greatly from its mean or average value, i.e. from the value of an equivalent ideal d-c current, during the course of current flow. Stated differently, the peak value of the output current I must be substantially greater than the magnitude of a d-c current which remains constant throughout an entire half cycle of the output voltage U and transmits the same amount of power through the rectifier 1a as the output current I. Consequently, when a sinusoidal output voltage U is used to transmit a given amount of power, the rectifier 1a must be designed for a higher peak current than would be the case if the same amount of power were transmitted by means of a current having a rectangular wave form and a constant amplitude throughout each half cycle of the output voltage U.

Figure 4:
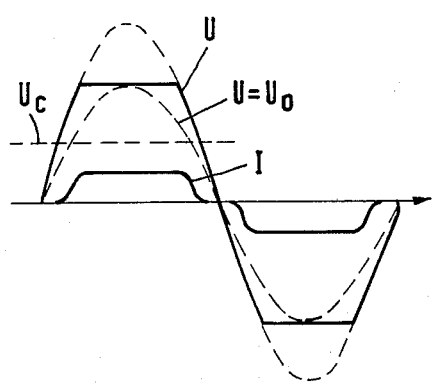
FIG. 4 is similar to FIG. 2 but shows the wave forms of the input voltage and current when the a-c power supply for the d-c power consuming unit generates a generally trapezoidal output voltage in accordance with the invention.
Figure 5:
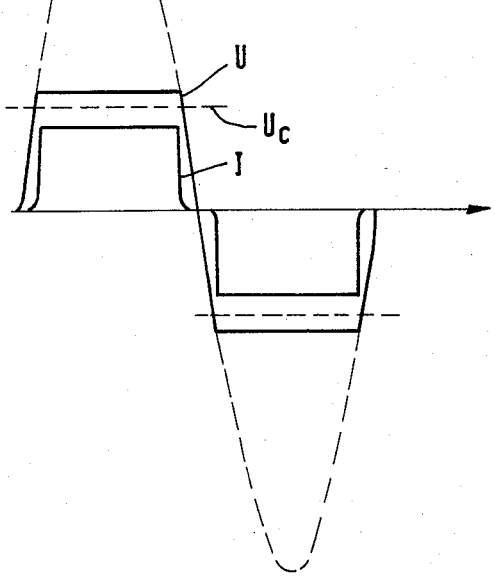
FIG. 5 is similar to FIG. 4 but shows the wave forms of the input voltage and current for a smoothing capacitor having a higher capacitance than in FIG. 4.

In view of the above, the a-c power supply N according to the invention generates an output voltage U as illustrated in FIGS. 4 and 5. FIG. 4 represents a situation in which the smoothing capacitor 1c has a relatively low capacitance while FIG. 5 represents a situation in which the smoothing capacitor 1c has a relatively high capacitance.

When the d-c power consumer 1d does not draw any load or current, the a-c power supply N generates an output voltage $U=U_O$ having a sinusoidal wave form. The output voltage $U_O$ at zero load is illustrated in FIG. 4. As the consumer 1d begins to draw load or current, the output voltage U of the a-c power supply N assumes a wave form which is at least approximately trapezoidal. Regardless of the load or current drawn by the consumer 1d, the maximum amplitude of the output voltage U remains constant and has the same absolute value as the maximum amplitude of the output voltage $U_O$ at zero load. The output current I of the a-c power supply N under load likewise has a wave form which is at least approximately trapezoidal. Accordingly, the ratio of the effective value of the output current I to its mean or average value is only slightly greater than the ideal value of unity.

Although the maximum amplitude of the trapezoidal wave form remains constant, the slope of the edges of the trapezoidal waves increases automatically with increasing load. As a result, the point during each half cycle at which the output voltage U exceeds the residual voltage $U_c$ of the smoothing capacitor 1c becomes earlier as the load increases. Similarly, the output voltage U drops below the residual voltage $U_c$ at a later time with increasing load. Consequently, the period for which the output current I flows during each half cycle increases as the load increases. This may be observed by comparing FIGS. 4 and 5. The period of current flow in FIG. 5, where the load exceeds that in FIG. 4, is greater than the period of current flow in FIG. 4.

The output voltage U tends to become sinusoidal as the load drawn by the consumer 1d approaches zero but remains trapezoidal as long as the consumer 1d draws load. Once the load becomes zero, the output voltage U assumes the sinusoidal wave form $U_O$. On the other hand, the output voltage U approaches a rectangular wave form as the load drawn by the consumer 1d increases but never achieves a rectangular wave form. In other words, the edges of the waves representing the output voltage U always have a finite slope. The output current I likewise approaches the ideal rectangular wave form with increasing load but, again, never achieves the rectangular wave form due to the fact that the output voltage U remains trapezoidal.

While the form factor of the rectangular wave form makes this the ideal wave form, the trapezoidal wave form has the advantage that the pulses delivered to the smoothing capacitor 1c are less abrupt than those which would be delivered by the rectangular wave form. This stems from the fact that the edges of rectangular waves have infinite slopes whereas the edges of trapezoidal waves have finite slopes. Pulses which are excessively abrupt or sudden can result in overloading of the rectifier 1a and the smoothing capacitor 1c since, in practice, the smoothing capacitor 1c constitutes a short circuit when the voltage changes very rapidly. This is particularly true when the smoothing capacitor 1c has a very high capacitance. Accordingly, the trapezoidal wave form permits the smoothing capacitor 1c to have a higher capacitance than would be the case if the output voltage U and the output current I possessed the otherwise ideal rectangular wave form. This, in turn, enables the smoothing and buffering effects of the smoothing capacitor 1c to be improved.

FIGS. 4 and 5 illustrate that the trapezoidal wave form of the output voltage U may be obtained by generating a sinusoidal voltage having a variable amplitude and then clipping or limiting each half wave of the sinusoidal voltage having an amplitude greater than a predetermined amplitude at the predetermined amplitude.

FIGS. 4 and 5 also show that the edges of the trapezoidal waves have slopes which equal or exceed the corresponding slopes of sinusoidal waves having the same period and maximum amplitude as the trapezoidal waves. This may be observed by comparing the sinusoidal output voltage $U_O$ of FIG. 4 with the trapezoidal output voltages U of FIGS. 4 and 5.

The residual voltage U of the smoothing capacitor 1c increases as the output voltage U increases during each half cycle. Similarly, the smoothing capacitor 1c discharges and the residual voltage $U_c$ decreases as the output voltage U drops. For the sake of simplification, these effects have been neglected in FIGS. 2–5 and the residual voltage $U_c$ shown as a constant. This does not affect the explanation of the invention due to the fact that the smoothing capacitor 1c is here assumed to have a high capacitance as is conventional for a smoothing and buffering capacitor. On the one hand, the high capacitance causes the residual voltage $U_c$ to increase only slightly during each half cycle of the output voltage U. On the other hand, the high capacitance causes the residual voltage $U_c$ to rise and drop more slowly than the output voltage U so that the latter is able to exceed and drop below the residual voltage $U_c$ during each half cycle.

Figure 6:
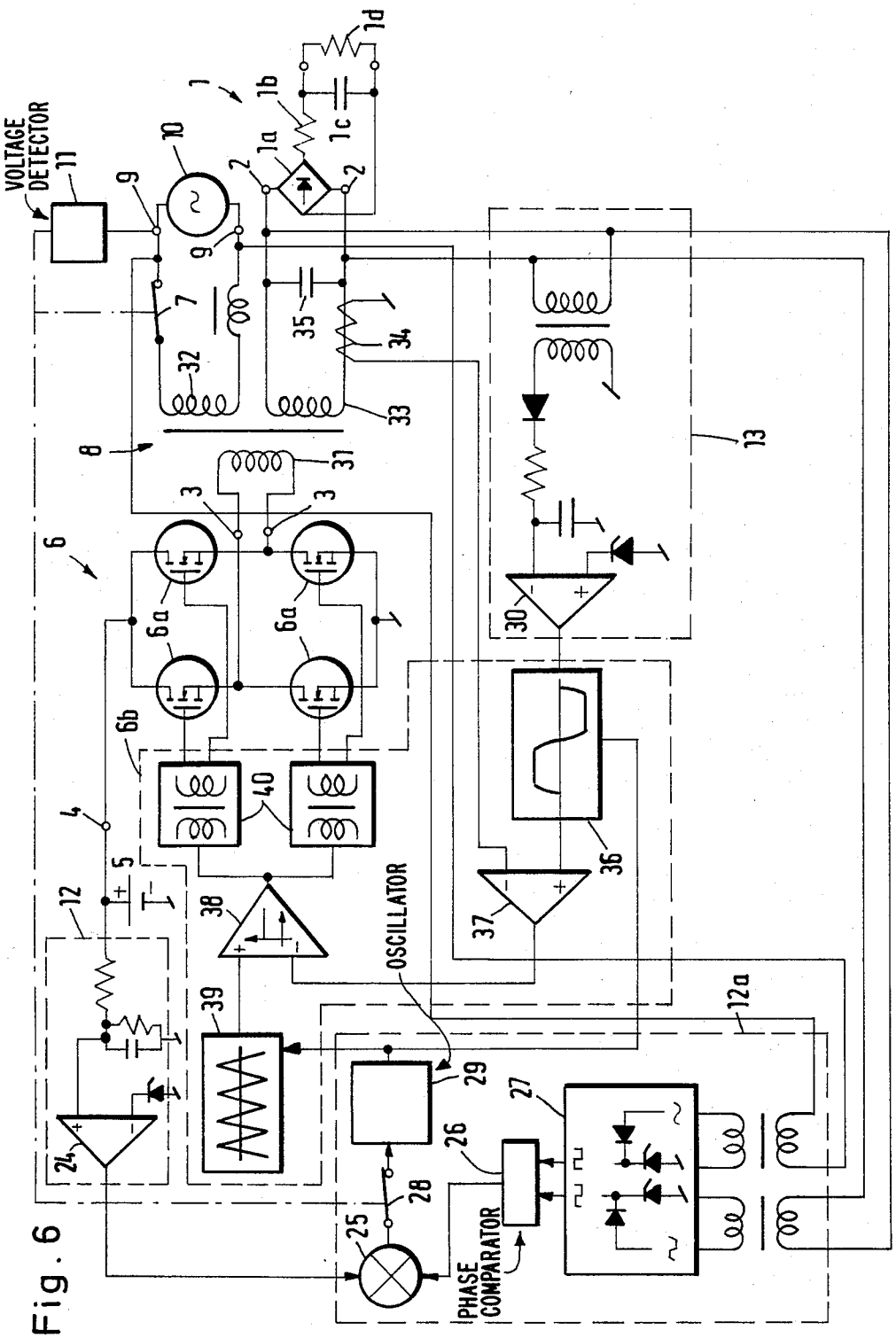
FIG. 6 illustrates details of the a-c power supply of FIG. 1.

FIG. 6 illustrates the details of the a-c power supply N of FIG. 1. As will become more apparent below, the a-c power supply N is designed so as to be capable of supplying the d-c power consuming unit 1 with current in the event of an emergency or a malfunction.

The terminals 2 of the d-c power consuming unit 1 are connected to the output of a leakage-reactance transformer 8. The leakage-reactance transformer 8 has an input/output which is connected to a pair of terminals 3 constituting an a-c input/output of an adjustable or controllable static converter 6. The static converter 6 is reversible and may function as a rectifier as well as an inverter. In other words, the static converter 6 may transform an a-c voltage into a d-c voltage or vice versa.

The static converter 6 has a terminal 4 which constitutes a d-c input/output. A rechargeable battery 5 is connected to the terminal 4.

The static converter 6 comprises a bridge circuit made up of adjustable rectifiers 6a which are here in the form of enhancement type, insulated gate, field effect transistors. The rectifiers 6a are controlled by a pulse width modulator 6b.

The a-c power supply N further includes an a-c voltage source or generator 10 having a pair of terminals 9. The a-c voltage source 10 may be a conventional a-c supply network or main. The terminals 9 of the a-c voltage source 10 are connected with the terminals 2 of the power consuming unit 1 and the terminals 3 of the static converter 6 via a switch 7 and the leakage-reactance transformer 8. A voltage detector 11 connects into the line between the a-c voltage source 10 and the switch 7 and, as indicated by dash-and-dot lines, is arranged to open and close the switch 7. The switch 7 is normally closed. However, when the supply of current from the a-c voltage source 10 is interrupted because of a broken wire or a short circuit, the voltage detector 11 automatically opens the switch 7. The a-c power supply N also includes a d-c voltage regulator 12 having an input which is connected with the battery 5 and the d-c terminal 4 of the static converter 6. The d-c voltage regulator 12 further has an output which is connected with an input of a frequency regulator 12a. The frequency regulator 12a is arranged to transmit signals to the pulse width modulator 6b which, in turn, delivers signals to the control terminals of the adjustable rectifiers 6a. Through the agency of the frequency regulator 12a, the d-c voltage regulator 12 controls the phase positions of rectangular adjusting pulses which are sent to the control terminals of the adjustable rectifiers 6a via the pulse width modulator 6b. The d-c voltage regulator 12 senses the voltage of the battery 5 and adjusts the phase positions of the adjusting pulses delivered to the rectifiers 6a accordingly. The d-c voltage regulator 12 functions to shift the phase positions of the adjusting pulses to the rectifiers 6a relative to the a-c voltage generated by the a-c voltage source 10. When the voltage of the battery 5 is too low, the phase positions of the adjusting pulses are shifted in such a manner that, on average, the a-c voltage source 10 delivers a pulsating d-c current to the battery 5 via the static converter 6 and the terminal 4 which is higher than that delivered from the battery 5 to the power consuming unit 1 via the terminal 4 and the static converter 6. The battery 5 is thus charged to the desired extent. The battery 5 is charged and its voltage stabilized independently of the load drawn by the power consuming unit 1.

The a-c power supply N additionally comprises an a-c voltage regulator 13 having an input which is connected with the terminals 2 of the power consuming unit 1. The a-c voltage regulator 13 controls the relationship between the input and output signals of the rectifiers 6a via the pulse width modulator 6b. The relationship between the input and output signals of the rectifiers 6a is controlled in such a manner that the a-c voltage produced at the terminals 2 by filtering the outgoing rectangular pulses of the rectifiers 6a has a constant mean or average value.

When the a-c voltage source 10 malfunctions so that the normal a-c operating voltage at the terminals 9 is interrupted, the voltage detector 11 immediately opens the switch 7 which may be in the form of an electronic switch. As a result, the power consuming unit 1, which previously drew current from the a-c voltage source 10, now receives current from the battery 5 via the static converter 6. The flow of current to the power consuming unit 1 is thus uninterrupted in spite of the malfunction of the a-c voltage source 10. The static converter 6, which acts as a rectifier while the a-c voltage source 10 is in operation, acts as an inverter while the power consuming unit 1 draws current from the battery 5. The a-c voltage regulator 13 continues to operate and stabilize the a-c voltage at the terminals 3 of the static converter 6 and the terminals 2 of the power consuming unit 1 until the battery 5 has run down. The capacity of the battery 5 is advantageously so large that the normal charge of the battery 5 suffices to provide the power consuming unit 1 with its energy needs until the malfunction which interrupted the operation of the a-c voltage source 10 has been corrected.

Once the malfunction has been corrected and the normal a-c operating voltage is again applied to the terminals 9 of the a-c voltage source 10, the switch 7 is automatically closed by the voltage detector 11. Consequently, the power consuming unit 1 is once more supplied with current from the a-c voltage source 10. The d-c voltage regulator 12 ensures that the battery 5 is recharged via the static converter 6 which again acts predominantly as a rectifier.

The d-c voltage regulator 12 includes a comparator which does not possess flip-flop characteristics. The comparator is here in the form of a differential amplifier 24 having a non-inverting input (+) and an inverting input (−). The non-inverting input of the differential amplifer 24 is connected to the battery 5 and the d-c terminal 4 of the static converter 6 via a voltage divider containing a smoothing capacitor. The inverting input of the differential amplifier 24 is connected with a Zener diode which establishes the desired voltage of the battery 5. The output of the differential amplifer 24 constitutes the output of the d-c voltage regulator 12.

The frequency regulator 12a contains a summing device 25 having an input which is connected with the output of the differential amplifier 24. The summing device 25 has a second input which receives control signals generated by the frequency regulator 12. The signals from the differential amplifier 24 are superimposed with these control signals in the summing device 25. The control signals of the frequency regulator 12a are generated by a phase comparator 26. The phase comparator 26 has a pair of inputs which receive signals from two corresponding outputs of a pulse shaper 27. The pulse shaper 27 has a pair of inputs corresponding to its two outputs. One input of the pulse shaper 27 is connected to the terminals 2 of the d-c power consuming unit 1 and thereby to the static converter 6 via the leakage-reactance transformer 8. The other input is connected to the terminals 9 of the a-c voltage source 10.

The pulse shaper 27 transforms the a-c voltages generated by the static converter 6 and the a-c voltage source 10 into rectangular signals which are fed to the phase comparator 26. The phase comparator 26 compares the phases of the rectangular signals derived from the static converter 6 and the a-c voltage source 10 and emits a d-c voltage which is representative of the phase difference between the rectangular signals. This d-c voltage is fed to the summing device 25 where it is summed with the signals from the differential amplifier 24. The summing device 25 has an output which issues signals representing the results of the summing operation.

The output of the summing device 25 is connected with the input of a voltage-regulated oscillator 29 via a switch 28. As indicated by dash-and-dot lines, the switch 28 is controlled by the voltage detector 11. The switch 28 is normally closed. However, in the event of a malfunction of the a-c voltage source 10, the voltage detector 11 automatically opens the switch 28.

The frequency of the oscillator 29 is proportional to the incoming voltage. The oscillator 29 has an output which transmits signals to the pulse width modulator 6b. The output signals of the oscillator 29 determine the switching frequency of the rectifiers 6a via the pulse width modulator 6b. The output signals of the oscillator 29 are pulse width modulated in the pulse width modulator 6b in a manner which depends upon the signals generated by the a-c voltage regulator 13. The pulse width modulation is such that the a-c voltage generated by the static converter 6 at the a-c terminals 3 has the same frequency as the a-c voltage generated by the a-c voltage source 10. However, the a-c voltage generated by the static converter 6 is phase-shifted relative to the a-c voltage of the a-c voltage source 10 by an angle such that the desired charging of the battery 5 occurs when the output signals of the summing device 25 are zero or almost zero.

Similarly to the d-c voltage regulator 12, the a-c voltage regulator 13 comprises a comparator which does not possess flip-flop characteristics. The comparator is here again in the form of a differential amplifier 30 having a non-inverting input (+) and an inverting input (−). The inverting input of the differential amplifier 30 is connected with the terminals 2 of the d-c power consuming unit 1 which receive the a-c output voltage generated at the a-c terminals 3 of the static converter 6.

The a-c output voltage is rectified and smoothed before arriving at the inverting input of the differential amplifier 30. The non-inverting input of the differential amplifier 30 is connected with a Zener diode which establishes the desired mean or average value of the a-c output voltage to be supplied to the d-c power consuming unit 1. The differential amplifier 30 compares the rectified and smoothed a-c output voltage with the voltage established by the Zener diode and issues a signal which is proportional to the difference between these voltages. This signal is transmitted to the pulse width modulator 6b. The magnitude of the signal generated by the differential amplifier 30 determines the pulse width.

The leakage-reactance transformer 8 has three windings 31, 32 and 33. The winding 31 is directly connected to the a-c terminals 3 of the static converter 6. The winding 32 is connected with the terminals 9 of the a-c voltage source 10. One end of the winding 32 is connected to the respective terminal 9 via the switch 7 while the other end of the winding 32 is connected to the corresponding terminal 9 via a reactance coil. The winding 33 is connected to the terminals 2 of the d-c power consuming unit 1. A current transformer 34 is disposed between one end of the winding 33 and the respective terminal 2.

A filter capacitor 35 is connected across the terminals 2. The filter capacitor 35 filters out the frequency and harmonics of the adjusting pulses supplied to the static converter 6.

The leakage-reactance transformer 8 functions to provide galvanic separation between the d-c power consuming unit 1, the a-c voltage source 10 and the static converter 6. The leakage reactance transformer 8 further functions as as inductive current-limiting impedance for limiting the current between the terminals 3 and the terminals 9 as well as between the terminals 2 and the terminals 9.

The leakage-reactance transformer 8 has an iron core which is made up of a U-shaped section and an I-shaped section separated by an air gap. The windings 31 and 33 are disposed on one leg of the U-shaped core section while the winding 32 is arranged on the other leg of the U-shaped core section. The windings 31 and 32 are separated by a relatively large distance as are the windings 32 and 33. The air gap between the the U-shaped and I-shaped core sections combined with the relatively large distances of separation between the windings 31, 32 and the windings 32, 33 causes a significant leakage flux to exist between the windings 31, 32 as well as between the windings 32, 33. The leakage inductance of this flux has a current limiting effect. In contrast, the windings 31 and 33 are very closely coupled so that they generate a negligible leakage inductance.

From the description to this point, it will be appreciated that the a-c power supply N constitutes an emergency power supply in that it is capable of delivering current to the d-c power consuming unit 1 when the a-c voltage source 10 malfunctions. Additional details of the structure and operation of such a power supply may be had by reference to the German Pat. Nos. 30 33 034 and 31 28 030. The disclosures of the German patents are incorporated herein by reference.

The pulse width modulator 6b of the a-c power supply N according to the invention further comprises a sine wave generator 36 having an input which is connected with the output of the a-c voltage regulator 13. It will be observed that the output of the a-c voltage regulator 13 is constituted by the output of the differential amplifier 30. The sine wave generator 36 is adjustable and generates a sine wave having an amplitude which depends upon the output voltage of the a-c voltage regulator 13. The sine wave generator 36 is also designed to limit the amplitude of or clip each half wave of the sine curve having an amplitude greater than a predetermined amplitude. Thus, as the output voltage of the a-c voltage regulator 13 increases, the sine wave generator 36 initially generates a sinusoidal voltage of increasing amplitude. When the amplitude of the sinusoidal voltage exceeds the predetermined amplitude, the portion of each half wave exceeding the predetermined amplitude is suppressed or clipped. The predetermined amplitude corresponds to the peak value of the output voltage U of the a-c power supply N when the d-c power consumer 1d draws zero load or current. As the voltage delivered by the a-c voltage regulator 13 to the sine wave generator 36 continues to increase beyond that at which the sine wave achieves the predetermined amplitude, the edges of the waves generated by the sine wave generator 36 increase in slope. Furthermore, the period for which the predetermined amplitude of the voltage is maintained during each half cycle, and hence the mean or average value of the voltage generated by the sine wave generator 36, increases as the voltage applied to the input of the sine wave generator 36 increases beyond that required to achieve the predetermined amplitude. However, the peak value of the voltage generated by the sine wave generator 36 remains unchanged once the predetermined amplitude has been exceeded.

The pulse width modulator 6b further contains a comparator which does not possess flip-flop characteristics. The comparator is here in the form of a differential amplifier 37 having a non-inverting input (+) and an inverting input (−). The non-inverting input of the differential amplifier 37 is connected with an output of the sine wave generator 36. The inverting input of the differential amplifier 37 is connected with a conductor which leads to the current transformer 34. The current transformer 34 produces a voltage at the inverting input of the differential amplifier 37 which is representative of the output current I of the a-c power supply N.

The pulse width modulator 6b comprises an additional comparator which is again in the form of a differential amplifier 38 having a non-inverting input (+) and an inverting input (−). In contrast to the differential amplifiers 24, 30 and 37, the differential amplifier 38 possesses flip-flop characteristics. In other words, the amplification factor of the differential amplifier 38 is so large that its output voltage immediately flips to one or the other of two values whenever the slightest difference exists between the voltages applied to the inverting and non-inverting inputs of the differential amplifier 38.

The inverting input of the differential amplifier 38 is connected with the output of the differential amplifier 37. On the other hand, the non-inverting input of the differential amplifier 38 is connected with the output of a saw-tooth wave generator 39.

The differential amplifier 38 has an output which emits rectangular pulses. The output of the differential amplifier 38 is connected with the input of each of a pair of isolating transformers 40 constituting part of the pulse width modulator 6b. Each of the isolating transformers 40 has two outputs which are respectively connected with one of the rectifiers 6a. The rectangular pulses transmitted by the differential amplifier 38 to the rectifiers 6a via the isolating transformers 40 serve to control or adjust the rectifiers 6a.

The saw-tooth wave generator 39, which constitutes part of the pulse width modulator 6b, has an input which is connected with the output of the oscillator 29. The sine wave generator 36 likewise has an input which is connected with the output of the oscillator 29. The output voltage of the oscillator 29 accordingly synchronizes the saw-tooth wave generator 39 and the sine wave generator 36.

The frequency of the saw-tooth wave generator 39 is a large multiple of the frequency of the sine wave generator 36. For instance, the frequency of the saw-tooth generator 39 may be of the order of 10 kHz while the frequency of the sine wave generator 36 may be of the order of 50 Hz.

Assuming that the output current I of the a-c power supply N has an approximately trapezoidal wave form and is approximately in phase with the trapezoidal output voltage of the sine wave generator 36, the voltage applied to the inverting input of the differential amplifier 37 is also approximately trapezoidal and approximately in phase with the trapezoidal output voltage of the sine wave generator 36. Consequently, the output voltage of the differential amplifier 37 is approximately trapezoidal. The approximately trapezoidal output voltage of the differential amplifier 37 is compared with the triangular or saw-tooth output voltage of the saw-tooth wave generator 39 in the differential amplifier 38. Whenever the magnitude of the triangular or saw-tooth voltage exceeds or drops below the magnitude of the trapezoidal voltage, the output voltage of the differential amplifier 38 flips to one or the other of its values. Accordingly, the width of the output pulses of the differential amplifier 38 increases as the voltage of a trapezoidal pulse from the differential amplifier 37 increases, that is, as the voltage rises along the leading edge of a trapezoidal pulse from the differential amplifier 37. The width of the output pulses from the differential amplifier 38 remains constant while the trapezoidal pulse maintains its maximum amplitude. The width of the output pulses of the differential amplifier 38 decreases as the voltage of the trapezoidal pulse from the differential amplifier 37 decreases, that is, as the voltage drops along the trailing edge of the trapezoidal pulse. The average or mean value of the high frequency output pulses of the differential amplifier 38, and accordingly the mean or average value of the high frequency output pulses of the static converter 6 at the terminals 3 and the terminals 2, thus have trapezoidal wave forms corresponding to that of the output voltage of the differential amplifier 37. The frequencies of the trapezoidal wave forms representing the mean or average values of the output pulses of the differential amplifier 38 and the static converter 6 are relatively low and correspond to the frequency, e.g. 50 Hz, of the sine wave generator 36.

The a-c voltage regulator 13, the sine wave generator 36 and the differential amplifier 37 together constitute a control means or a control unit. To understand the operation of the control unit constituted by the a-c voltage regulator 13, the sine wave generator 36 and the differential amplifier 37, it is assumed for the moment that the voltage at the non-inverting input (+) of the differential amplifier 37 is constant and represents a fixed, desired value. When the output current I of the a-c power supply N increases so that the voltage at the inverting input (−) of the differential amplifier 37 increases, the output voltage of the differential amplifier 37 decreases. This causes the output voltage U of the a-c power supply N to drop. A drop in the output voltage U, however, results in a drop in the output current I. This causes a reduction in the voltage applied to the inverting input of the differential amplifier 37 so that the output voltage of the latter increases thereby again increasing the output current I. This process continues until an equilibrium condition is established in which the voltages at the inputs of the differential amplifier 37 are approximately equal.

In practice, the output voltage of the sine wave generator 36 is not constant but has a trapezoidal wave form. Therefore, a voltage signal representative of the output current I of the a-c power supply N is fed back to the inverting input of the differential amplifier 37 so that the wave form of the output current I is adjusted to the trapezoidal wave form of the voltage delivered to the non-inverting input of the differential amplifier 37 by the sine wave generator 36. The output voltage of the sine wave generator 36 constitutes a control signal for the output current I.

The a-c voltage regulator 13 ensures that the mean or average value of the trapezoidal output voltage U of the a-c power supply N maintains the desired value set by the Zener diode connected with the non-inverting input of the differential amplifier 30. Furthermore, the sine wave generator 36 is designed so as to prevent its trapezoidal output voltage from exceeding the predetermined amplitude at which the sine curve is clipped. Accordingly, the a-c output voltage U does not exceed a corresponding maximum value.

As outlined earlier, the maximum amplitude of the trapezoidal output voltage of the sine wave generator 36, as well as the maximum amplitude of the a-c output voltage of the a-c power supply N, remain constant. This means that the average or mean value of the output voltage U can be changed only by changing the slope of the edges of the trapezoidal waves generated by the sine wave generator 36. The changes in slope of the edges of the trapezoidal waves generated by the sine wave generator 36 are accompanied by changes in slope of the edges of the waves representing the output voltage U at the terminals 2. Consequently, the mean or average value of the a-c output voltage U is maintained constant by appropriate changes in the slopes of the edges of the waves representing the output voltage U.

As the output current I of the a-c power supply N increases so that the mean or average value of the output voltage U decreases, the output voltage of the differential amplifier 30 increases. The increase in the output voltage of the differential amplifier 30, in turn, causes the edges of the waves generated by the sine wave generator 36 to increase in slope. As explained above, this results in an increase in the mean or average value of the output voltage U. However, the increase in slope of the edges of the waves generated by the sine wave generator 36 also causes the edges of the trapezoidal waves representing the output current I to increase in slope. Thus, an increase in the load drawn by the d-c power consumer 1d automatically causes the wave form of the output current I to approach the ideal rectangular wave form.

When the output current I approaches zero, that is, when a no-load condition is approached, the output voltage of the differential amplifier 37, and hence the output voltage U of the a-c power supply N, increase. At a certain point, however, the a-c voltage regulator 13 counteracts a further increase in the output voltage U by attenuating the sine wave generator 36. The parameters of the a-c power supply N are selected in such a manner that a stable equilibrium condition exists when the incoming voltage at the inverting input of the differential amplifier 37 is zero and the sine wave generator 36 generates a pure sine wave having a peak value equal to the maximum value of the trapezoidal output voltage of the sine wave generator 36 under load, i.e. under conditions where the output current I has a value other than zero. The output voltage U of the a-c power supply N under no-load conditions likewise has a sinusoidal wave form with a peak value equal to the maximum value of the output voltage U under load.

In accordance with the invention, the period for which the output current I flows during each half cycle of the output voltage U increases automatically with increasing load. This is achieved in that the differential amplifier 37 superimposes the incoming voltage waves at its inverting and non-inverting inputs in such a manner that the superimposed portions of the voltage waves are of opposite sense or have opposite signs.

Various modifications are possible without departing from the spirit of the invention. For example, the illustrated a-c power supply N may be replaced by a power supply having a d-c voltage source and a simple inverter for transforming the voltage generated by the d-c voltage source into an a-c voltage. In the modified a-c power supply, the leakage-reactance transformer 8 may be replaced by a simple output transformer made up of the windings 31, 33 and having filtering means such as the filtering capacitor 35. Such a modified power supply may be controlled using only the a-c voltage regulator 13, the oscillator 29, the current transformer 34, the sine wave generator 36, the saw-tooth wave generator 39 and the differential amplifiers 37, 38. All remaining elements of the a-c power supply N, including the a-c voltage source 10, may be eliminated in the modified power supply. It will be observed that the modified power supply constitutes an a-c power supply in spite of the absence of the a-c voltage source 10.

As another example of a possible modification, the rechargeable battery 5 may be replaced with an electrolytic capacitor or a rectifier which is connected with an a-c main or net.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A power system comprising:
   (a) a d-c power consuming unit including a rectifier, and a source of load; and
   (b) an a-c power supply for said unit designed to generate an output voltage having an at least approximately trapezoidal wave form when said unit consumes power, said wave form having a finite slope at substantially all absolute values of said output voltage smaller than the maximum amplitude of said wave form, and the absolute values of said slope at substantially all absolute values of said output voltage other than said maximum amplitude being at least equal to the corresponding absolute values of the slope of a sinusoidal curve having the same maximum amplitude and period as said wave form, said power supply comprising control means for maintaining a substantially constant means value of said output voltage, and said control means including an a-c voltage regulator having a regulator input for sensing the mean value of said output voltage and a regulator output for generating regulating signals representing the difference between the sensed means value of said output voltage and a predetermined mean value, said control means further including an adjustable sine wave generator connected with said regulator output and arranged to generate a sine wave having an amplitude which depends upon the magnitudes of said regulating signals, and said sine wave generator being designed to clip each half wave having an amplitude greater than a predetermined amplitude at said predetermined amplitude.

2. The system of claim 1, wherein said unit comprises smoothing means.

3. The system of claim 2, wherein said smoothing means comprises a smoothing capacitor.

4. The system of claim 1, wherein said power supply is designed such that said wave form approaches a sinusoidal shape as the power consumption of said unit approaches zero, said output voltage being substantially sinusoidal when the power consumption of said unit is substantially zero.

5. The system of claim 1, wherein said control means is arranged to maintain said maximum amplitude substantially constant.

6. The system of claim 1, said control means having a control input, and a control output for generating control signals; and wherein said power supply comprises conductor means connected with said control input, said conductor means being arranged to transmit indicator signals representative of the output current corresponding to said output voltage to said control input so that said control signals are a function of said indicator signals.

7. The system of claim 6, wherein said power supply comprises an adjustable converter having a converter output which is coupled to said unit and generates said indicator signals.

8. The system of claim 7, wherein said power supply comprises a d-c voltage source arranged to deliver d-c voltage to said converter.

9. The system of claim 1, wherein said predetermined amplitude substantially equals said maximum amplitude.

10. The system of claim 1, said sine wave generator having a sine wave generator output for emitting first signals; and wherein said power supply comprises conductor means for transmitting second signals representative of the output current corresponding to said output voltage, and comparing means having a first comparing input connected with said sine wave generator output and a second comparing input connected with said conductor means, said comparing means being designed to superimpose said first and second signals.

11. The system of claim 10, wherein said comparing means is designed to superimpose said first and second signals in such a manner that said first signals have opposite signs from the respective superimposed second signals.

12. The system of claim 1, said control means having a control output for generating control signals; and wherein said power supply comprises an adjustable converter having a converter output which is coupled to said unit, and adjusting means for said converter interposed between said converter and said control output.

13. The system of claim 12, said adjusting means having a pair of adjusting inputs, and said control output being connected with one of said adjusting inputs; and wherein said power supply comprises a saw-tooth wave generator having a saw-tooth wave generator output connected with the other of said adjusting inputs.

14. The system of claim 13, wherein said adjusting means comprises an adjusting comparator having flip-flop characteristics.

15. The system of claim 13, wherein said power supply comprises synchronizing means for synchronizing said generators.

16. The system of claim 13, wherein the frequency of said saw-tooth wave generator is a multiple of the frequency of said sine wave generator.

17. The system of claim 13, wherein said control means comprises a control comparator having said control output and a pair of comparing inputs, said sine wave generator having a sine wave generator output connected with one of said comparing inputs, and said power supply including conductor means connected with the other of said comparing inputs and arranged to deliver indicator signals representative of the output current corresponding to said output voltage to said other control input.

18. The system of claim 17, wherein said control comparator does not have flip-flop characteristics.

19. The system of claim 1, wherein said power supply comprises an adjustable, reversible converter having a d-c input/output and an a-c input/output which is coupled to said unit, said power supply further comprising a d-c voltage source which is connected with said d-c input/output and an a-c voltage source which is connected with said a-c input/output.

20. The system of claim 19, wherein said d-c voltage source comprises a rechargeable device for storing electrical energy.

21. The system of claim 20, wherein said device comprises a battery.

22. The system of claim 20, wherein said device comprises an electrolytic capacitor.

23. The system of claim 20, wherein said power supply comprises a d-c voltage regulator for regulating charging of said device.

24. The system of claim 23, said converter being designed to generate a first a-c voltage at said a-c input/output, and said a-c voltage source being designed to generate a second a-c voltage; and wherein said d-c voltage regulator is designed to shift the phase of said first a-c voltage relative to the phase of said second a-c voltage in such a manner that said a-c voltage source charges said device when the latter is at least partially discharged.

25. The system of claim 23, wherein said power supply comprises adjusting means having an adjusting output for transmitting adjusting signals to said converter, said d-c voltage regulator being designed to regulate the phase of said adjusting signals in dependence upon the degree to which said device is charged.

26. The system of claim 19, comprising current limiting means between said a-c input/output and said a-c voltage source.

27. The system of claim 26, wherein said current limiting means comprises a leakage-reactance transformer.

28. The system of claim 27, wherein said leakage-reactance transformer comprises a first winding coupled to said a-c input/output, a second winding coupled to said unit, and a third winding coupled to said a-c voltage source.

29. A power generating method comprising the steps of:
(a) generating an a-c output voltage having an at least approximately trapezoidal wave form, said wave form having a finite slope at substantially all absolute values of said output voltage smaller than the maximum amplitude of said wave form, and the absolute values of said slope at substantially all absolute values of said output voltage other than said maximum amplitude being at least equal to the corresponding absolute values of the slope of a sinusoidal curve having the same maximum amplitude and period as said wave form, the generating step comprising maintaining a substantially constant mean value of said output voltage, and the generating step including forming a sinusoidal wave, clipping each half wave having an amplitude greater than a predetermined amplitude at said predetermined amplitude, and superimposing the clipped sinusoidal wave with the wave form of the output current corresponding to said output voltage to generate a control signal;
(b) rectifying said output voltage to obtain a d-c voltage; and
(c) developing power with said d-c voltage.

30. The method of claim 29, comprising the step of smoothing said d-c voltage prior to the developing step.

31. The method of claim 29, wherein the generating step is linked to the developing step in such a manner that said wave form approaches a sinusoidal shape as the power developed during the developing step approaches zero, said output voltage being substantially sinusoidal when the power developed during the developing step is substantially zero.

32. The method of claim 29, wherein the generating step comprises maintaining said maximum amplitude substantially constant.

33. The method of claim 29, wherein said predetermined amplitude substantially equals said maximum amplitude.

34. The method of claim 29, wherein the superimposing step is performed in such a manner that superimposed portions of said clipped sinusoidal wave and said wave form of said output current have opposite signs.

35. The method of claim 29, wherein the generating step comprises forming a saw-tooth wave, and comparing said control signal with said saw-tooth wave to generate an adjusting signal which determines said wave form.

36. The method of claim 35, wherein the generating step comprises synchronizing said sinusoidal wave with said saw-tooth wave.

37. The method of claim 35, wherein the frequency of said saw-tooth wave is a multiple of the frequency of said sinusoidal wave.

38. The method of claim 29, comprising the step of storing electrical energy during the generating step.

39. The method of claim 38, wherein the generating step comprises generating an a-c input voltage, and the storing step comprises adjusting the phases of said output and input voltages in such a manner as to enable said input voltage to store electrical energy.

* * * * *